(12) United States Patent
Lu et al.

(10) Patent No.: US 8,732,793 B2
(45) Date of Patent: May 20, 2014

(54) METHOD AND SYSTEM FOR IMPROVING SECURITY OF THE KEY DEVICE

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 1582 days.

(21) Appl. No.: 11/938,803

(22) Filed: Nov. 13, 2007

(65) Prior Publication Data

US 2008/0294902 A1 Nov. 27, 2008

(30) Foreign Application Priority Data

Jan. 24, 2007 (CN) .......................... 2007 1 0063013

(51) Int. Cl.
*H04L 29/00* (2006.01)
(52) U.S. Cl.
USPC .................................. 726/2; 726/5; 713/168
(58) Field of Classification Search
USPC .......................... 713/168; 705/35; 726/2, 5, 9
See application file for complete search history.

(56) References Cited

U.S. PATENT DOCUMENTS

| | | | |
|---|---|---|---|
| 2005/0246292 A1* | 11/2005 | Sarcanin .......................... | 705/67 |
| 2007/0011066 A1* | 1/2007 | Steeves .......................... | 705/35 |
| 2007/0195960 A1 | 8/2007 | Goldman et al. | |
| 2007/0230706 A1 | 10/2007 | Youn | |
| 2008/0110983 A1* | 5/2008 | Ashfield ........................ | 235/382 |
| 2008/0154770 A1* | 6/2008 | Rutherford et al. ............. | 705/44 |

* cited by examiner

*Primary Examiner* — Edward Zee
*Assistant Examiner* — Chi Nguy
(74) *Attorney, Agent, or Firm* — Hammer & Associates, P.C.

(57) ABSTRACT

The present invention provides a method and a system for improving security of a key device in the information security filed. In order to solve the problem that the security performance of the key device is lower due to the possible tamper of the data needed for encryption and signature in prior art, the present invention provides the method, including steps in which the key device is connected to a computer, then is used to receive the data input by the user through a computer and display the same after a user makes a successful authentication; and to make digital signature or encryption of the data input after the user confirms the content displayed. The above-mentioned system comprises an authentication module, a data receiving module, a display module, a confirmation information receiving module, and a key module. The present invention makes relative display on the key device according to the data input by the user, and provides an input device or generates a random authentication code for confirmation and therefore prevents invalid digital signature or encryption, and improves the security of the key device greatly.

6 Claims, 2 Drawing Sheets

METHOD AND SYSTEM FOR IMPROVING SECURITY OF THE KEY DEVICE

FIELD OF THE INVENTION

The present invention relates to the information security field, and more particularly, to a method and a system for improving security of the key device.

BACKGROUND OF THE INVENTION

The key device, or security token device, is a small hardware device with a processor and a memory, and it uses the dual-factor authentication method, being simple for use and lower in cost. With a built-in single chip microcomputer or a smart card chip, the key device can store the user's key or digital certificate, and uses the encryption algorithm inside the key device to authenticate the user's ID. The key device has functions as email encryption, digital signature, security certificate, security network logon, access to SSL (Security Socket Layer) network etc and has advantage of ensuring the private key to be never apart with the hardware device, with anti-attack physical performance, thereby providing higher security.

The key device generally authenticates a user's ID by encryption or digital signature based on the public key system. The above-mentioned signature ensures the confidentiality and non-repudiation of the information. As a principle of using digital signature in authentication, firstly, it is to make signature of a plaintext with a user's private key to get a digital signature, then send the digital signature to a person responsible for the authentication; secondly, the person decrypts the public key of the authenticated user, and compares the result with the original plaintext to the finish authentication. The data of the digital signature is limited in size, therefore the authenticated user needs to make HASH operation of the plaintext to be signed, and then sends the HASH value to the key device for signing. HASH algorithm, also known as one-way hash algorithm, is an algorithm unable to make a reverse operation of the original information in the case of having known the operation result and algorithm. The hash algorithm generates a constant output size from the input information with different size (also known as "seed").

The above-mentioned process cannot ensure the security of the data to be signed or encrypted because the computer itself also has security troubles. For example, when a computer is hit by a Trojan virus, the data to be encrypted or signed will be changed by the low-layer Trojan, and then be sent to the key device for digital signature or encryption. Therefore, the user cannot judge whether the data to be encrypted or signed in the key device is true, which seriously affects the security of the key device, makes the key device unvalued, and suffers the user with unnecessary loss.

The display technology makes a quite great development. Thus, people is no longer confined to a display with big size and high power consumption, it is easy to get a display part with smaller size, lower power consumption, higher performance, and it is easy to be developed. It is possible to use the part to a key device. The liquid crystal display, OLED, and LED etc are all good choices, especially the liquid crystal technology. The liquid crystal display has advantages of low working voltage, low power consumption, large quantity of information, long life span, no electromagnetic emission, and complicated word displaying ability.

SUMMARY OF THE INVENTION

In order to solve the problem that the security of the key device is lower due to the possible tamper in data to be encrypted or signed in prior art, the invention provides a method for improving security of the key device, including steps of:

Step A: connecting the key device with a computer and authenticating a user's ID; after a successful authentication, the computer receiving the data input by the user and sending it to the key device;

Step B: the key device displaying the data sent by the computer after receiving it, and making digital signature or encryption of the data input by the user after receiving the authentication information input according to information displayed in the key device.

Preferably, said step B is a step that the key device displays the data transferred from the computer after receiving the same; and makes digital signature or encryption of the data input by the user after receiving the confirmation information input by the user when the data displayed in the key device is consistent with that input.

Preferably, said step B is a step that the key device firstly resolves the important data acquired after receiving the data transferred from the computer, and displays the same, and then makes digital signature or encryption of the data input by the user after receiving the confirmation information input by the user when the important data displayed in the key device is consistent with the data input.

In the step B, the user inputs confirmation information with the input device of the key device.

The input device is a single button, digital key, light-sensitive part, fingerprint scanner, voice control switch, temperature sensor, pressure sensor, vibration sensor, acceleration sensor, magnet sensor, or electric field sensor.

Preferably, said step B is a step that the key device generates a random authentication code and displays it, and verifies whether the confirmation code is consistent with the authentication code generated randomly by far, if so, makes digital signature or encryption of the data input by the user after receiving the confirmation code input from the computer by the user.

The authentication code generated randomly by the key device differs every time.

In step A, steps of user's authentication comprise a step of authenticating whether the PIN or the biometrics input by a user is true.

The present invention also develops a system for improving security of the key device which comprises:

an authentication module for authenticating a user's ID after the key device is connected to the computer;

a data receiving module for receiving data transferred from the computer after the authentication module makes a successful authentication and the computer receives the data input by the user;

a display module for displaying the data transferred from the computer after the data receiving module received the same;

a confirmation information receiving module for receiving the confirmation information input by the user according to the content displayed in the display module; and a key module for making digital signature or encryption of the data, input by the user, received from a data receiving module after the confirmation information module receives the confirmation information input by the user.

Said display module is particularly used to display the data after the data receiving module receives the data transferred from the computer.

The system also comprises:

a data resolution module for resolving the important data acquired after the data receiving module receives the data transferred from the computer;

accordingly, the display module is further used to display the important data.

The system further comprises:

an authentication code generating module for generating a random authentication code being different every time;

accordingly, the display module is further used to display the authentication code generated currently by the authentication code generating module;

the confirmation information receiving module is particularly used to receive the confirmation code input by the user according to the authentication code displayed in the display module;

the key module is particularly used to make digital signature or encryption of the data, input by a user and received by the data receiving module in the case of verification of the confirmation code in consistent with the authentication code randomly generated at present by the confirmation code generating module, after the confirmation information receiving module receives the confirmation code input by the user.

The system further comprises:

an input device used for a user to input confirmation information and to send it to the confirmation information receiving module.

The input device is a single button, digital key, light-sensitive part, fingerprint scanner, voice control switch, temperature sensor, pressure sensor, vibration sensor, acceleration sensor, magnet sensor, or electric field sensor.

The present invention displays the data input by a user for his confirmation in the key device by display technology before the key device makes digital signature or encryption; and the user makes confirmation through the input device of the key device or the authentication code generated randomly by the key device, which effectively avoids an invalid signature or encryption, and as a result, improves the security of the key device greatly.

DETAILED DESCRIPTION OF THE PREFERRED EMBODIMENTS

A further description of the invention will be given with drawings and embodiments, but the invention is not limited to these embodiments.

Embodiment 1

The authentication method in the embodiment 1 is that through a PIN code, and the data to be signed or encrypted is the information needed by a user in transaction, for example, bank account number, transaction data, transaction amount etc. The user inputs the transaction information into the key device from a computer, and confirms the data displayed in the key device through a special input computer (namely a single button) in the key device.

Figure 1:
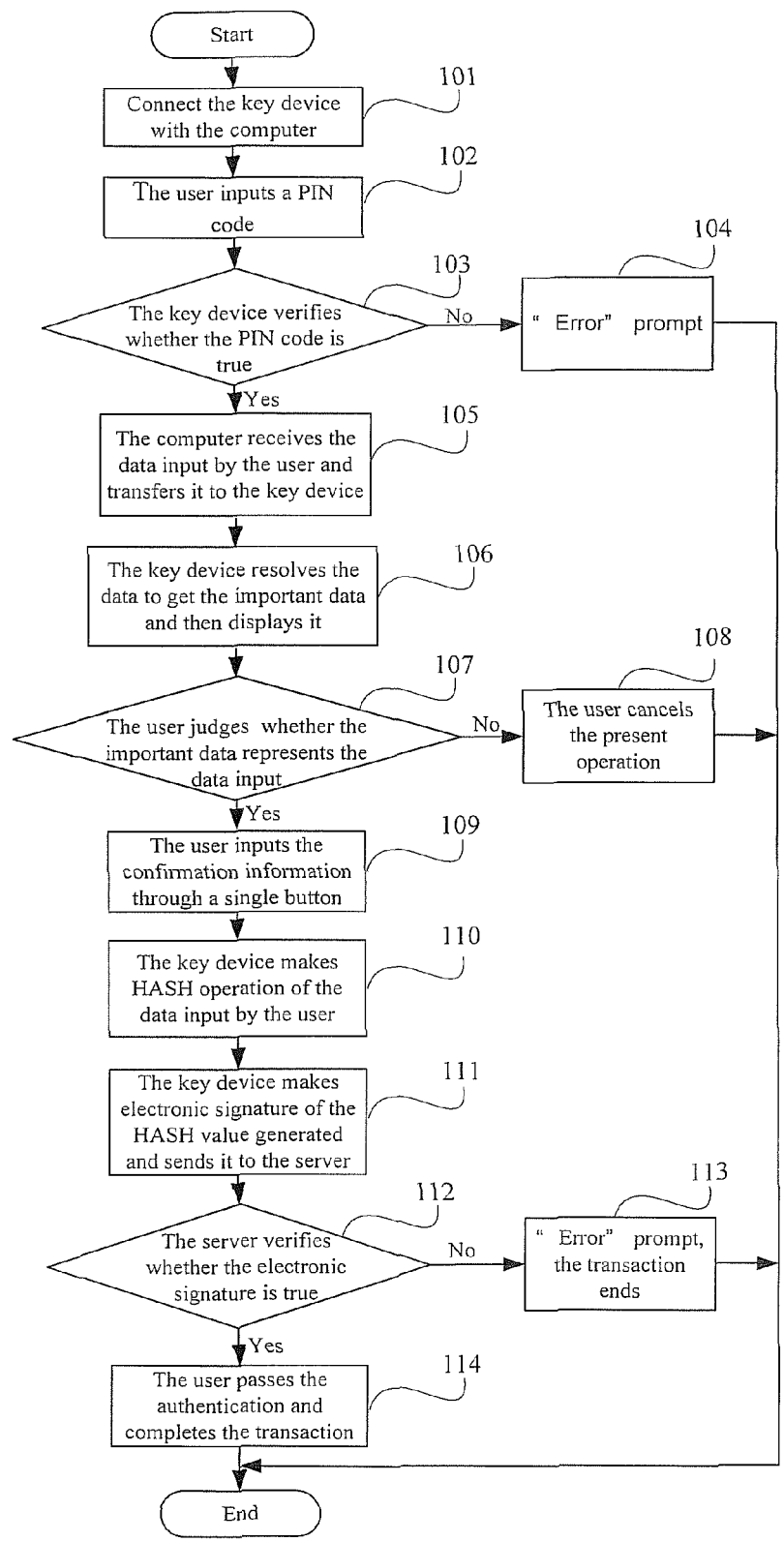
FIG. 1 is a flowchart of the method for improving security of the key device in Embodiment 1 of the invention.

Referring to FIG. 1, the present invention provides a method for improving security of the key device, including the following steps:

Step 101: the user connects the key device to a client computer.

Step 102: the user inputs a PIN code;

Step 103: the key device verifies whether the PIN code input by a user is correct, if so, skip to 105; if the PIN code is incorrect and maximum retries have reached, skip to 104;

Step 104: if the user is invalid, the key device will display an "ERROR" prompt, and end the transaction;

Step 105: the user confirms the valid owner of the key device through an authentication, and then the computer receives information needed to transaction and input by a user, and inputs the transaction information into the key device.

Step 106: the key device receives the data transferred from a computer, and makes resolution of the same to get the important data, and then displays the important data which is a part of the data transferred from the computer representing the data input by the user. For example, the data input by a user is user's name, bank account number, transaction date, transaction type, and transaction amount. The important data is a bank account number, transaction type and transaction amount, which represents the above five data.

Step 107: the user judges whether the important data displayed in the key device is the same with the data input by a user, that is to say, judges whether the important data displayed in the key device represents the data needed to transaction, if so, slip to 109; otherwise skip to 108.

Step 108: the user cancels the present operation, and ends the transaction.

Step 109: the user inputs the confirmation information into the key device through the input component in the key device, namely a single button, that is to say, confirms whether the important data displayed in the key device represents the information needed to transaction.

Step 110: after the key device receives the confirmation information of the user, it makes HASH operation of the transaction information input by the user and gets the Hash value.

Step 111: the key device uses the private key to make signature of the HASH value, and sends the signature to the server through client computer.

Step 112: the server uses the public key corresponding to the private key to authenticate the digital signature, if passed, skip to 114; otherwise, skip to 113.

Step 113: the server returns error information, as the authentication failed, the transaction is completed.

Step 114: as the authentication is passed, the transaction is completed.

The input component in the embodiment 1, i.e. the single button, can be replaced with number key or light-sensitive part, fingerprint scanner, voice control switch, temperature sensor, pressure sensor, vibration sensor, acceleration sensor, magnet sensor, or electric field sensor; the method that the user makes authentication by inputting a PIN can be replaced with by inputting biometrics.

Embodiment 2

Different from embodiment 1, in the embodiment 2, the user confirms the important data displayed in the key device by inputting the authentication code, that is to say, the key device generates a random authentication code, and displays it while displaying the important data. When the user confirms the important data displayed in the key device, the confirmation code must be input according to the authentication code displayed, and then the computer transfers the authentication code input by the user to the key device. Then the key device compares the confirmation code input by the user with the authentication code generated randomly, if they are the same as each other, it indicates that the user has confirmed the important data displayed in the key device; otherwise, the key device displays "ERROR" prompt, meaning the failure of the user's authentication. Other processes are similar to those in embodiment 1, so it does not need to explain them again.

Because the authentication code is generated randomly and is different every time, the security of the key device is improved greatly. Even though the authentication code generated this time is listened, the listener cannot pass the authentication and cannot use the user's information to make invalid transaction etc, because the authentication has been generated again and different from that before in the later authentication.

In the two above-mentioned embodiments, the content displayed in the key device is the important data acquired after resolution, and the user makes confirmation by judging whether the important data is consistent with the data input by himself. The method can be replaced with that the key device does not execute the resolution step, but directly displays the data transferred from the computer, accordingly, the user makes confirmation by judging whether the data displayed in the key device is consistent with that input by himself.

Embodiment 3

Figure 2:
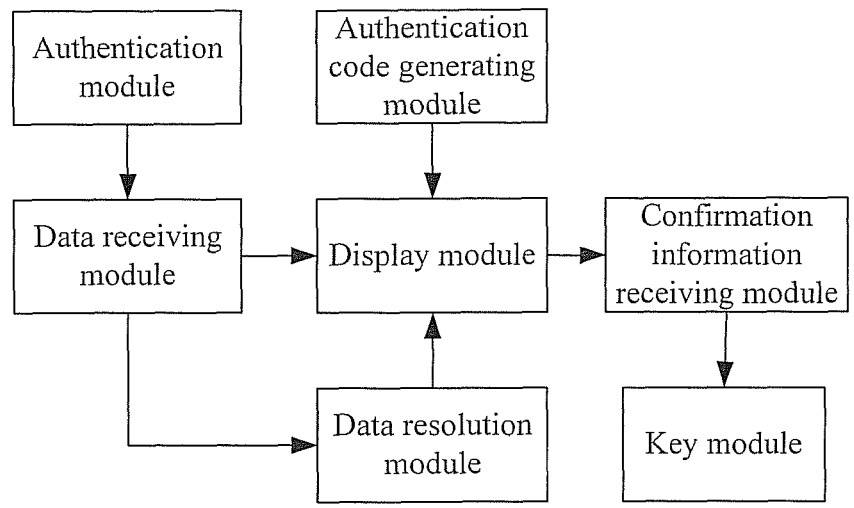
FIG. 2 is a system structure diagram of improving security of the key device in Embodiment 3 of the invention.

Referring to FIG. 2, the invention further provides a system for improving security of the key device, including:

an authentication module for authenticating the user's ID after the key device is connected to a computer;

a data receiving module for receiving the data transferred from the computer after the authentication module makes a successful authentication and the computer receives the data input by a user;

a display module for displaying the data transferred from the computer after the data receiving module received the same;

a confirmation information receiving module for receiving the confirmation information input according to the content displayed in the display module;

a key device module for making digital signature or encryption of the data received by a data receiving module, and input by a user after the confirmation information receiving module receives the confirmation information input by a user.

The display module is particularly used to display the data transferred from a computer after receiving the same.

The system for improving security of the key device further comprises:

a data resolution module for resolving the important data after the data receiving module receives the data input by a computer;

accordingly, the display module is also used to display the important data.

The system for improving security of the key device further comprises:

an authentication code generating module for generating randomly an authentication code different every time;

accordingly, the display module for displaying the authentication code currently generated by an authentication code generating module;

the confirmation information receiving module for receiving the confirmation code input from the computer according to the authentication code displayed in the display module;

the key module particularly for making signature or encryption of the data, input by the user and received by the data receiving module in the case of the authentication of the confirmation code in consistent with the authentication code generated randomly by the authentication code generating module, after the confirmation information receiving module receives the confirmation code input by the user.

Embodiment 4

Figure 3:
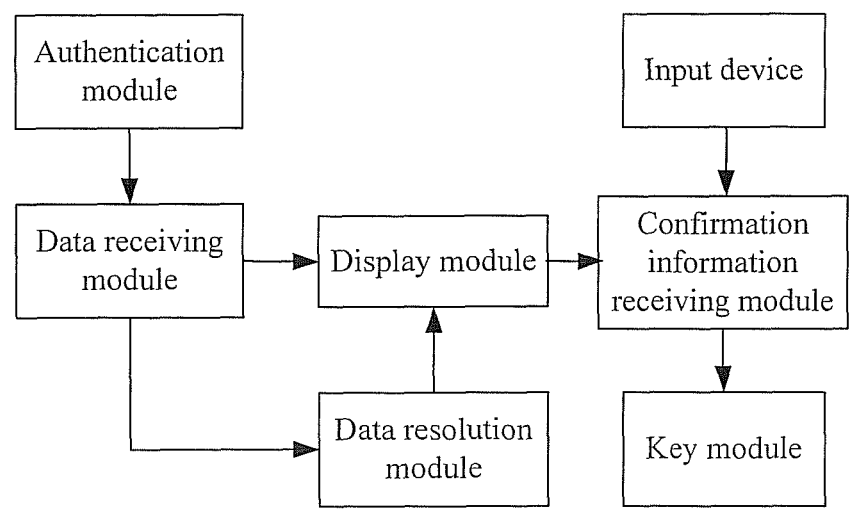
FIG. 3 is a system structure diagram of improving security of the key device in Embodiment 4 of the invention.

Referring to FIG. 3, the invention further provides a system for improving security of the key device, including:

an authentication module for authenticating a user's ID after the key device is connected to a computer;

a data receiving module for receiving the data transferred from the computer after the authentication module makes a successful authentication and the computer receives the data input by the use;

a display module for displaying the data transferred from the computer after receiving the same;

a confirmation information receiving module for receiving the confirmation information input by the user according to content displayed in the data receiving module;

a key module for making digital signature or encryption of the data, input by the user and received by the data receiving module after the confirmation information receiving module receives the confirmation information input by the user;

The display module is particularly used to display the data transferred from the computer after the data receiving module receives the same.

The system for improving security of the key device, including:

an input device used for a user to input the confirmation information, and transfer it to the confirmation information receiving module.

The input device is a single button, digital key, light-sensitive part, fingerprint scanner, voice control switch, temperature sensor, pressure sensor, vibration sensor, acceleration sensor, magnet sensor, or electric field sensor.

Those above-mentioned exemplary embodiments are only preferred ones of the invention, various changes and equivalents made by those skilled in the art in the technology scope of the invention should be protected by the invention.

The invention claimed is:

1. A method for improving security of a key device, comprising steps of:
  A) connecting the key device with a computer, and authenticating a device user who inputs a PIN code by the key device, after which if authentication is passed, the computer receives the data input by the user and transfers the data to the key device;
  B) displaying the data received from the computer by the key device, and making digital signature or encryption of the data input by the user after receiving a confirmation information input by the user according to the data displayed by the key device;
  C) sending the digital signature to a server through the computer;
  D) authenticating the digital signature by the server;
  E) returning an error information in response to failing the authentication of the digital signature; and
  F) completing a transaction in response to passing the authentication of the digital signature, wherein the confirmation information is input by the user with an input component of the key device; the Step B further comprises sub-steps in which the key device generates a random authentication code and then displays it; and verifies whether the confirmation information input is consistent with that random authentication code currently after receiving the confirmation information input by the user from the computer; if so, the key device makes digital signature or encryption of the data input by the user; and the authentication code generated randomly by the key device differs every time.

2. The method for improving security of the key device in accordance with claim 1, wherein in the step B, the key device displays the data after receiving the same from the computer; and makes digital signature or encryption of the data input by the user after receiving the confirmation information input by the user when the data displayed in the key device is consistent with the input one.

3. The method for improving security of the key device in accordance with claim 1, wherein in the step B, the key device resolves the data transferred from the computer to acquire an important data after receiving the same, then displays the important data; and makes digital signature or encryption of the data input by the user after receiving the confirmation information input by the user when the important data displayed in the key device is consistent with the input data.

4. The method for improving security of the key device in accordance with claim 1, wherein in the step B, the user uses an input device of the key device to input confirmation information into the key device.

5. The method for improving security of the key device in accordance with claim 4, wherein the input device is a single button, number keys, a light-sensitive part, a fingerprint scanner, a voice control switch, a temperature sensor, a pressure sensor, a vibration sensor, an acceleration sensor, a magnet sensor, or an electric field sensor.

6. The method for improving security of the key device in accordance with claim 1, wherein to authenticate the user in step A is to authenticate whether PIN code or biometrics input by the user is true.

* * * * *